(12) United States Patent
Weidemann et al.

(10) Patent No.: US 10,352,372 B2
(45) Date of Patent: Jul. 16, 2019

(54) DOG CLUTCH WITH A SENSOR FOR RECOGNIZING AN ENGAGED STATE

(71) Applicant: AUDI AG, Ingolstadt (DE)

(72) Inventors: Dieter Weidemann, Stammham (DE); Heiko Hanickel, Kipfenberg (DE); Florian Kolb, Gößweinstein (DE); Hans Jörg Brühl, Kösching (DE)

(73) Assignee: AUDI AG, Ingolstadt (DE)

( * ) Notice: Subject to any disclaimer, the term of this patent is extended or adjusted under 35 U.S.C. 154(b) by 108 days.

(21) Appl. No.: 15/516,978

(22) PCT Filed: Sep. 9, 2015

(86) PCT No.: PCT/EP2015/001815
§ 371 (c)(1),
(2) Date: May 5, 2017

(87) PCT Pub. No.: WO2016/055137
PCT Pub. Date: Apr. 14, 2016

(65) Prior Publication Data
US 2017/0248172 A1 Aug. 31, 2017

(30) Foreign Application Priority Data
Oct. 10, 2014 (DE) ........................ 10 2014 015 093

(51) Int. Cl.
*F16D 11/14* (2006.01)
*F16D 11/00* (2006.01)
*F16D 23/12* (2006.01)

(52) U.S. Cl.
CPC .............. *F16D 11/14* (2013.01); *F16D 23/12* (2013.01); *F16D 2011/006* (2013.01); *F16D 2300/18* (2013.01); *F16D 2500/1022* (2013.01)

(58) Field of Classification Search
None
See application file for complete search history.

(56) References Cited

U.S. PATENT DOCUMENTS 4,244,455 A * 1/1981 Loker ..................... F16D 11/04
192/24
9,829,103 B2 * 11/2017 Volpert ................... F16H 63/18
(Continued)

FOREIGN PATENT DOCUMENTS

| CN | 203685949 U | 7/2014 |
| DE | 102011077748 A1 | 12/2012 |
| EP | 0133645 A2 | 3/1985 |

OTHER PUBLICATIONS

Chinese Office Action dated Jul. 9, 2018, in connection with corresponding CN Application No. 201580067224.7 (12 pgs., including English translation).

(Continued)

*Primary Examiner* — Timothy Hannon
(74) *Attorney, Agent, or Firm* — Maier & Maier, PLLC

(57) ABSTRACT

A dog clutch having two clutch members provided with claws or teeth, one of which is movable, as well as a positioning device for engaging and disengaging the clutch by a positioning movement of the movable clutch member. In order to establish a proper engaging of the dog clutch, a sensor is arranged along the movement path of the movable clutch member, which detects the movement of the clutch member into the engaged state, while the clutch member is provided with an activating contour which, upon engaging the clutch, moves past the sensor, which is preferably an electromagnetic actuator for holding the movable clutch member in the disengaged state of the clutch.

9 Claims, 4 Drawing Sheets

(56) References Cited

U.S. PATENT DOCUMENTS

2002/0153220 A1* 10/2002 Dick ..................... F16D 11/10
                                                    192/69.8
2009/0014272 A1   1/2009 Tagami et al.
2012/0255382 A1* 10/2012 Richter ................. F16H 63/304
                                                    74/333
2013/0334001 A1  12/2013 Albrecht et al.

OTHER PUBLICATIONS

International Search Report and Written Opinion dated Feb. 29, 2016 of corresponding application No. PCT/EP2015/001615; 12 pgs.
Translation of International Preliminary Report on Patentability dated Apr. 20, 2017 of corresponding application No. PCT/EP2015/001815; 6 pgs.
Chinese Office Action dated Mar. 20, 2019, in connection with corresponding CN Application No. 201580067224.7 (12 pgs., including English translation).

* cited by examiner

DOG CLUTCH WITH A SENSOR FOR RECOGNIZING AN ENGAGED STATE

FIELD

The invention relates to a dog clutch having two clutch members provided with claws or teeth, one of which is movable, as well as a positioning device for engaging and disengaging, or closing and opening the clutch by a positioning movement of the movable clutch member.

BACKGROUND

Dog clutches generally possess two clutch members which can rotate about an axis of rotation, being provided on their mutually facing end surfaces with complementary engaging contours or tooth systems. The engaging contours or tooth systems are each composed of one or more rows of claws or teeth, being separated from neighboring teeth by tooth gaps and adapted to each other such that, when the clutch is engaged, the teeth of each clutch member reach into the gaps between the teeth of the other clutch member and produce a torque-resistant and form-fitting connection between the driving clutch member and the driven clutch member. One of the two clutch members is usually stationary in the axial direction of the axis of rotation, while the other clutch member can be moved back and forth by a positioning device in the axial direction of the axis of rotation, so that it can be brought into a form-fitting tooth engagement with the other clutch member to engage the clutch, or can be moved away from the other clutch member to disengage the clutch so that the teeth of the driving clutch member can rotate past the driven clutch member without making contact with its teeth.

Upon engaging or closing of dog clutches, however, it may happen that the teeth of the two clutch members to not stand opposite or abut against each other in pairs, so that they do not enter into the tooth gaps of the other clutch member. This means that the oppositely situated teeth of the two clutch members are only pressed against each other with friction locking, but no form-fitting connection is produced and thus neither is there any complete flow of force between the two clutch members.

A secure engaging or closing of dog clutches in the drive train of motor vehicles is generally ensured by a synchronizing mechanism, which adapts the rotary speed of the driven clutch member prior to the engaging of the clutch to the rotational speed of the driving clutch member so that the two rotational speeds differ slightly. In this way, when the two clutch members approach each other, the teeth of the two clutch members rotate slowly past each other and upon further approaching they enter into the gaps between the teeth of the other clutch member.

But since synchronizing mechanisms cause a not inconsiderable additional expense, one looks for possibilities of avoiding this expense, so that even without a synchronizing mechanism it is ensured that the clutch is in fact engaged or closed and that the clutch members are not standing "tooth on tooth".

In motor vehicles of the applicant with a disconnectable all-wheel drive, a dog clutch without a synchronizing mechanism is used in the drive train in order to switch on the switchable axle by engaging the dog clutch or to switch it off by disengaging the dog clutch. But since, due to the lack of a synchronizing mechanism, when the motor vehicle is standing still, the teeth of the one clutch member may either lie against the teeth gaps or the teeth of the other clutch member, on the one hand there should not be too much torque delivered when the clutch is engaged in a stationary vehicle, as this might lead to wear and tear if the two clutch members are still standing "tooth on tooth". On the other hand, however, adequate torque should be delivered to make possible a turning of the two clutch members in relation to each other in the case of a "tooth on tooth" position and to distribute torque on both axles when first driving off. This compromise is seen as a disadvantage.

SUMMARY OF THE DISCLOSURE

Starting from this, the object of the invention is to extensively improve a dog clutch of the aforementioned kind and especially a dog clutch not outfitted with a synchronizing mechanism in a drive train of a motor vehicle so that a proper engaging of the dog clutch can be established.

This object is achieved according to the invention in that a sensor is arranged along the movement path of the movable clutch member, which detects the movement of the clutch member into the engaged state.

In the motor vehicles of the applicant with the disconnectible all-wheel drive and the dog clutch in the drive train between the two axles, the remedy according to the invention can deliver sufficient torque to the dog clutch even when the vehicle is standing still so that both axles or all wheels are driven when first driving off, if it has been ascertained with the aid of the sensor that the movable clutch member has moved properly into form-fitting tooth engagement with the other clutch member and thus the dog clutch is found securely in the engaged state.

A preferred embodiment of the invention calls for the clutch member to be provided with an activating contour, which moves past the sensor when the clutch is engaged. The movement of the activating contour past the sensor generates a signal which can be evaluated so as to detect the movement of the clutch member into the engaged state. The activating contour is appropriately arranged so that it does not move past the sensor if the dog clutch is not properly closed and the two clutch members are still in a "tooth on tooth" position.

Advantageously, the sensor is an electromagnetic sensor, comprising a coil and an armature, of which the latter is displaced by the movement of the activating contour past the sensor and a measurable voltage is thereby induced in the coil.

If the dog clutch is already provided with an electromagnetic actuator in order to hold the movable clutch member in the disengaged state, and if this actuator comprises a coil, an armature and a pin connected to the armature, which is brought into engagement with a locking contour of the movable clutch member upon activating the actuator, as is the case with the dog clutch in the drive train of the motor vehicles of the applicant with the disconnectible all-wheel drive, then according to a specially preferred embodiment of the invention, the actuator can be used at the same time as a sensor for detecting the movement of the movable clutch member into the engaged state. For this purpose, the activating contour provided on the movable clutch member is advantageously disposed behind the locking contour in the movement direction of the clutch member when it is being engaged, so that it exerts a force on the pin and thereby displaces the armature in the coil when it moves past the pin or underneath the pin during the engaging of the clutch after the unlocking. Thanks to the movement of the armature, a voltage is induced in the coil of the actuator, which can be evaluated in order to detect the proper engaging of the clutch.

In other words, the actuator is used at the same time as a detector, while the pin can be used both as a detent for holding the clutch member and as a sensor for detecting the movement of the clutch member. In this way, a separate sensor besides the actuator is unnecessary.

The pin in the disengaged clutch advantageously stands in engagement with a locking contour of the movable clutch member and when using the combined actuator/sensor as the actuator it can be displaced together with the armature by applying a voltage to the coil, in order to disengage it from its engagement with the locking contour and release the movable clutch member.

On the other hand, when using the combined actuator/sensor as the sensor, the activating contour situated behind the locking contour in the movement direction of the clutch member displaces the pin upon engagement, and thus also the armature, when it moves past the pin upon engagement of the clutch, thus inducing a voltage in the coil.

The activating contour appropriately has an ascending flank in the movement direction of the clutch member, exerting a force on the pin and the armature so that the armature is displaced in the coil during the moving of the activating contour past the actuator/sensor. The voltage induced in the coil in this process is taken to an evaluation circuit with an A/D component and generates a trigger signal, indicating that the dog clutch has been properly engaged.

The present invention is preferably used for dog clutches in which the positioning device comprises a spring and especially a compression spring in order to move the movable clutch member into engagement with the other clutch member for the engaging of the clutch, because in these clutches and unlike clutches with exclusively hydraulic or electrical positioning devices it is not possible, or only difficultly possible to determine whether the clutch is engaged or closed.

BRIEF DESCRIPTION OF THE DRAWINGS

In the following, the invention shall be explained more closely with the aid of an exemplary embodiment shown in the drawing.

DETAILED DESCRIPTION OF THE DRAWINGS

Figure 1:
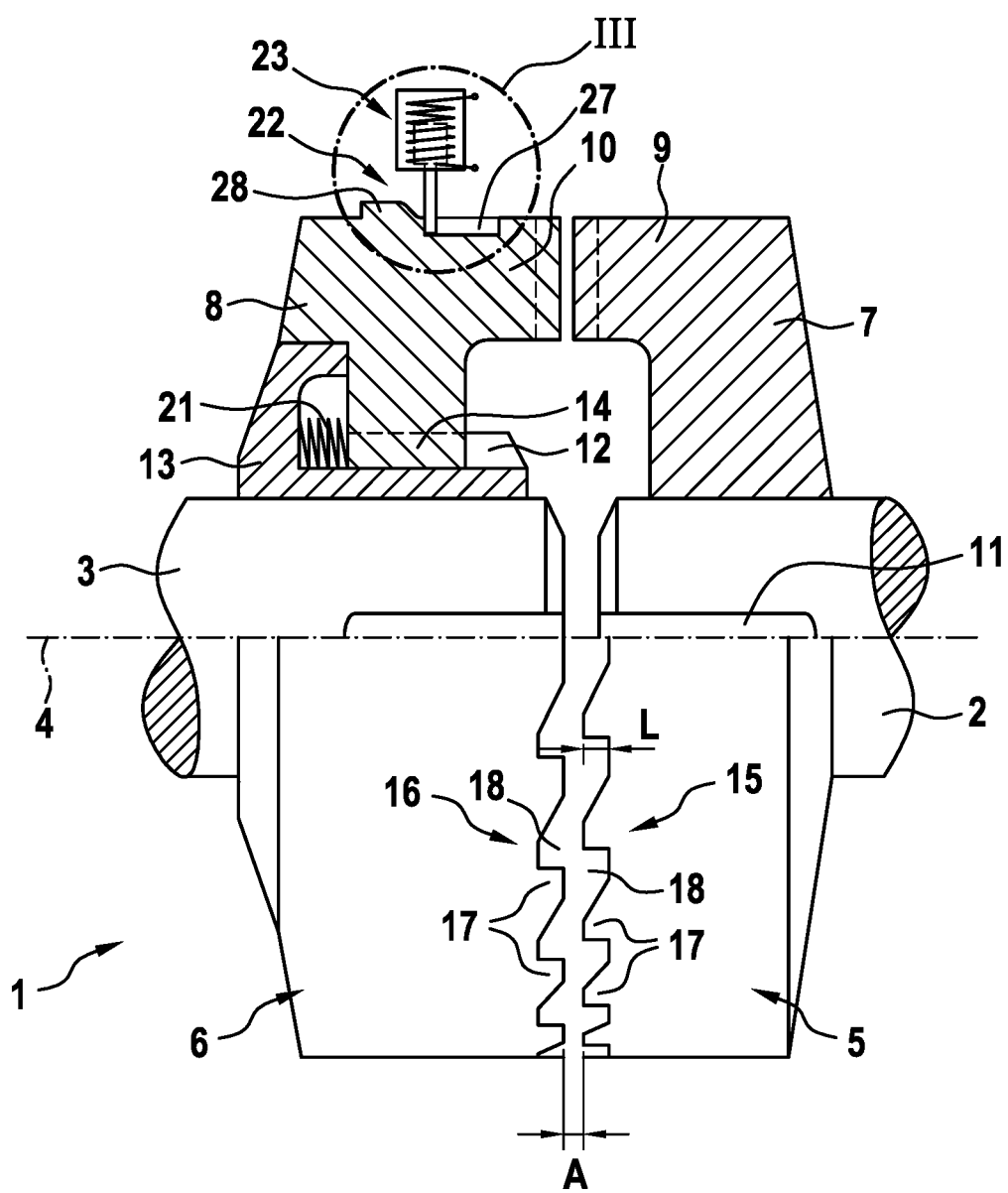
FIG. 1 shows a schematic partially sectional side view of a dog clutch according to the invention in the disengaged state.

The dog clutch 1 shown schematically in the drawing serves to join together in torque-resistant manner a first shaft 2 and a second shaft 3 with aligned axis of rotation 4 in a drive train of a motor vehicle with a disconnectable all-wheel drive for driving in all-wheel mode, and otherwise to separate them from each other. For example, the shaft 2 is the driving shaft and the shaft 3 is the driven shaft, being driven by the shaft 2 when the clutch 1 is engaged or closed.

The dog clutch 1 comprises a first clutch member 5, which is connected to the first shaft 2 in torque-resistant manner and unable to move in the axial direction of the axis of rotation 4, as well as a second movable clutch member 6, which is connected in torque-resistant manner to the second shaft 3 and able to move on the shaft 3 in the axial direction of the axis of rotation 4.

The two clutch members 5, 6 are generally designed coaxial to the shafts 2, 3 and each of them comprises a hub part 7 or 8, serving for the connection to the shaft 2 or 3, as well as a radially outer annular clutch part 9 or 10.

The hub part 7 of the first clutch member 5 is connected in torque-resistant manner to the first shaft 2. For this purpose, the shaft 2 is provided with a groove 11, into which there extends a spring (not shown), projecting beyond the inner circumference of a shaft bore of the clutch member 5.

Between the hub part 8 of the second clutch member 6 and the second shaft 3 there is situated a bushing 13 provided with an axial external toothing 12, being connected in torque-resistant manner to the second shaft 3 and unable to move axially in relation to the shaft 3. The external toothing 12 of the bushing 13 stands in tooth engagement with a complementary internal toothing 14 on the inner circumference of the hub part 8 of the second clutch member 6, so that the second clutch member 6 can move axially in relation to the bushing 13 and the second shaft 3.

The two clutch parts 9, 10 are provided with complementary tooth systems 15, 16 at their mutually facing end surfaces. The tooth systems 15, 16 are composed of a plurality of teeth 17 and tooth gaps 18, which may be designed alternating and symmetrical or nonsymmetrical in the circumferential direction of the clutch parts 9, 10. The tooth systems 15, 16 are in form-fitting engagement when the clutch 1 is engaged or closed (FIG. 2), the teeth 17 of the first clutch member 5 projecting entirely into the tooth gaps 18 of the second clutch member 6, the teeth 17 of the second clutch member 6 projecting entirely into the tooth gaps 18 of the first clutch member 5, and both tooth flanks 19, 20 of the teeth 17 lying against the oppositely situated boundaries of the tooth gaps 18. The tooth flanks 19 pointing in the direction of rotation of the teeth 17 of the first clutch member 5 on the drive shaft 2 and the oppositely situated boundaries of the tooth gaps 18 of the second clutch member 6 on the driven shaft 3 are generally oriented perpendicular to the direction of rotation, while the other tooth flanks 20 of the teeth 17 of the first clutch member 5 and the oppositely situated boundaries of the tooth gaps 18 of the second clutch member 6 are slanted in order to make it easier for the teeth 17 to engage in the tooth gaps 18.

For disengaging or opening the dog clutch 1 there is used a positioning element (not shown) of a hydraulically activated positioning device, or one operated by a spindle drive, for example, which acts on the movable second clutch member 6 in order to move it into the disengaged position, in which the top ends of the teeth 17 of the two tooth systems 15, 16 have a small axial distance A from each other, as shown in FIG. 1.

For the engaging or closing of the clutch 1, a return spring is arranged between the bushing 13 and the second clutch member 6 in the form of a helical compression spring 21, which, on the one hand, bears against the bushing 13 in stationary manner and, on the other hand, against the movable clutch member 6. The spring 21 is tensioned when the clutch member 6 is moved away from the clutch member 5 by the positioning element upon disengaging or opening the clutch 1.

In order to hold the second clutch member 6 in the disengaged or opened position, a locking mechanism 22 is provided, comprising an electromagnetic actuator/sensor 23 with a coil 24 and an armature 25 as well as a pin 26 projecting in a prolongation of the armature 25 beyond the actuator/sensor 23 and being rigidly connected to the armature 25. In actuator operation, a voltage is applied to the coil 24 in order to move the armature 25 forward or backward in the coil 24 and thereby move the pin 26 in or out. In sensor operation, a voltage is induced in the coil 24 when the armature 25 is moved forward or backward inside the coil 24 by a force exerted on the pin 26.

Opposite the actuator/sensor 23, the second clutch member 6 is provided on the outer circumference of the clutch part 10 with a locking contour 27 and with an activating contour 28, which cooperate with the pin 26 of the actuator/sensor 23 situated along the movement path of the second clutch member 6.

Figure 4:
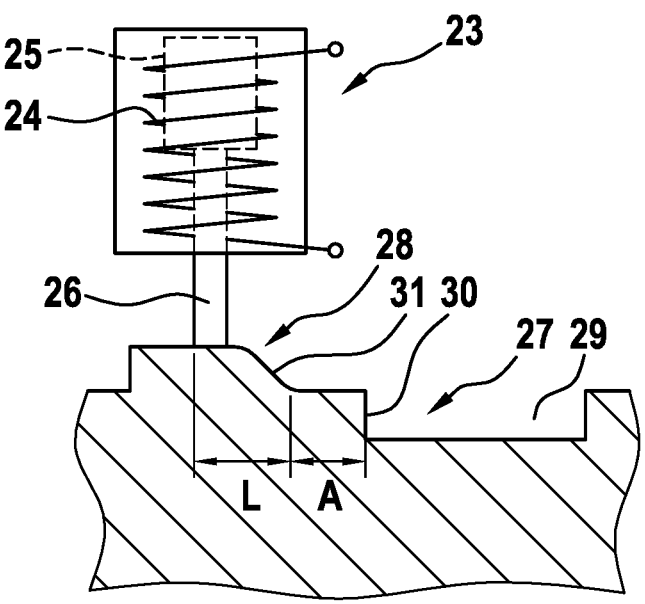
FIG. 4 shows an enlarged view of feature IV in FIG. 2.

As is best shown in FIG. 4, the locking contour 27 is composed substantially of a groove 29, which is provided at its end away from the first clutch member 5 with a step 30 oriented parallel to the movement direction of the pin 26. When the clutch 1 is disengaged or opened, the step 30 is pressed by the spring 21 against the previously extended pin 26, as shown in FIG. 1. In this position, the pin 26 holds the clutch member 6 firmly in the disengaged state and prevents the engaging or closing of the clutch 1.

When an unlocking voltage is applied to the coil 24 of the actuator/sensor 23, moving the armature 25 away from the clutch 1, the pin 26 is retracted, whereupon it moves out from the groove 29 of the locking contour 27 and releases the clutch member 6, which is then pressed by the spring 21 in the direction of the first clutch member 5.

Figure 2:
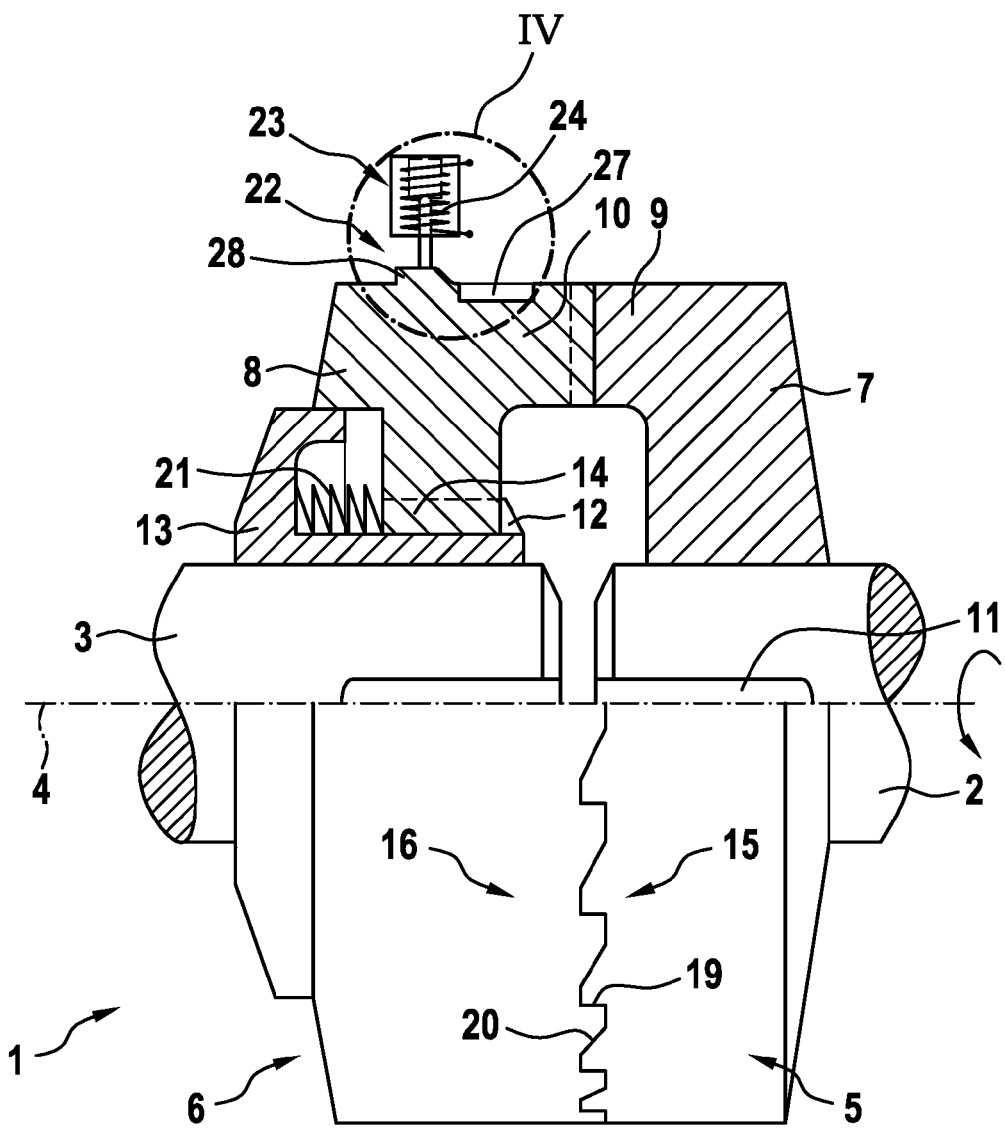
FIG. 2 shows a corresponding view of the dog clutch in the engaged state.
Figure 3:
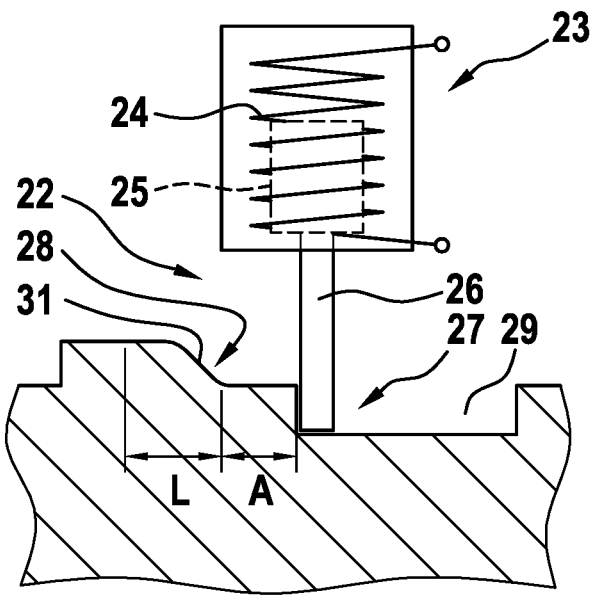
FIG. 3 shows an enlarged view of feature III in FIG. 1.

If in this state the teeth 17 of the clutch member 6 stand opposite the tooth gaps 18 of the clutch member 5, and vice versa, as shown in FIG. 1, the clutch member 6 is moved by the spring 21 until the teeth 17 of the two clutch members 5, 6 engage entirely in the tooth gaps 18 of the other clutch member 6, 5, as shown in FIG. 2. In this way, a proper form-fitting connection is produced between the two clutch members 5, 6.

Figure 5:
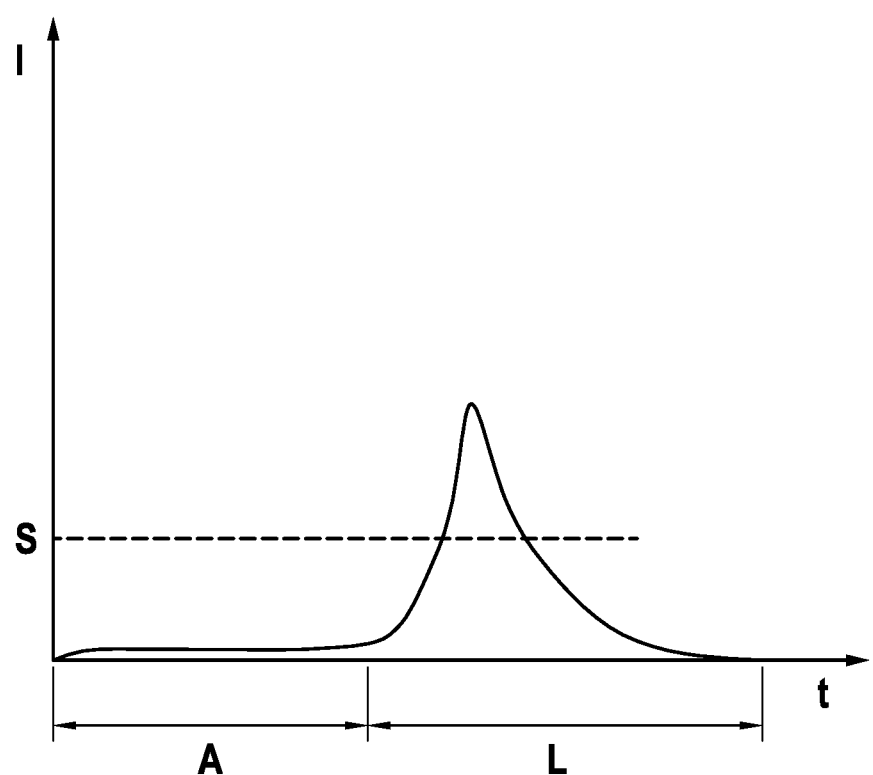
FIG. 5 shows a current/time diagram.

The activating contour 28 has a rising flank 31, facing the first clutch member 5, which begins at a distance A behind the step 30 on the outer circumference of the clutch member 6 in the movement direction of the clutch member 6 when the clutch 1 is engaged. The gradient of the flank 31, for example, increases gradually and then decreases again. The distance A corresponds to the axial distance between the tops of the teeth 17 of the two clutch members 5, 6 when the clutch 1 is disengaged or opened (FIG. 1), so that the rising flank 31 only moves underneath the partly extended pin 26 in the axial direction if the tooth systems 9, 10 of the two clutch members 5, 6 are engaging with each other. The length L of the activating contour 28 corresponds to the height of the teeth 17. While the activating contour 28 is moving underneath the pin 26 in the direction of the first clutch member 5, it exerts a force on the pin 26, which moves the armature 25 inside the coil 24 away from the dog clutch 1, as shown in FIG. 4. Thanks to this displacement of the armature 25, a voltage is induced in the coil, which causes a current to flow through the coil 24, as indicated in FIG. 5. The voltage induced in the coil 24 and/or the current flowing through the coil 24 are measured and evaluated by an evaluation circuit (not shown), connected to the coil 24, which contains an A/D component and generates a trigger signal when the voltage or the current exceeds a predetermined threshold value S, indicating a proper closing of the clutch 1.

On the other hand, if the teeth 17 of the first clutch member 5 are standing opposite the teeth 17 of the second clutch member 6 in a "tooth on tooth" position, the teeth 17 of the second clutch member 6 will be pressed by the spring 21 frictionally against the teeth 17 of the first clutch member 5. In this case, the activating contour 28 does not move underneath the pin 26, so that the armature 25 is not displaced inside the coil 24 and no voltage is induced in the coil 24, and no current flows. Therefore, the evaluation circuit does not generate any trigger signal. This means that the clutch 1 is not properly engaged or closed.

The invention claimed is:

1. A dog clutch, comprising:
two clutch members provided with claws or teeth, one clutch member of the two clutch members is movable in a linear motion, and a positioning device for engaging and disengaging the dog clutch by a positioning movement of the movable clutch member,
wherein a sensor is arranged along the movement path of the movable clutch member, and detects the movement of the movable clutch member into an engaged state,
wherein the movable clutch member is provided with an activating contour which, upon engaging the dog clutch, moves past the sensor,
wherein the sensor includes a pin which stands on the activating contour, and
wherein the sensor is combined with an electromagnetic actuator, and the electromagnetic actuator moves the pin.

2. The dog clutch according to claim 1, wherein the activating contour displaces an armature in a coil of the sensor via the pin and thereby induces a voltage in the coil.

3. The dog clutch according to claim 1, wherein the electromagnetic actuator holds the movable clutch member in a disengaged state of the dog clutch by moving the pin.

4. The dog clutch according to claim 3, wherein the pin of the sensor stands in engagement with a locking contour of the movable clutch member when the dog clutch is disengaged and this pin can be disengaged from engagement with the locking contour in order to release the movable clutch member.

5. The dog clutch according to claim 4, wherein the activating contour is disposed behind the locking contour in a movement direction of the clutch member when engaging the dog clutch.

6. The dog clutch according to claim 4, wherein the activating contour has an axial distance from the locking contour which corresponds to an axial distance of the teeth of the dog clutch in the disengaged state.

7. The dog clutch according to claim 6, wherein the activating contour has an axial length corresponding to a height of the teeth.

8. The dog clutch according to claim 1, further comprising an evaluation circuit with an A/D component connected to the sensor.

9. The dog clutch according to claim 1, wherein the positioning device includes a compression spring, which presses the movable clutch member into engagement with the other clutch member of the two clutch members for the engaging of the dog clutch.

* * * * *